United States Patent
Prinzo (10) Patent No.: US 12,439,845 B2
(45) Date of Patent: Oct. 14, 2025

(54) ADAPTIVE CUTTING SYSTEM, A LAWNMOWER INCLUDING SAME, AND METHOD FOR ADJUSTING A LAWNMOWER

(71) Applicant: Honda Motor Co., Ltd., Tokyo (JP)

(72) Inventor: Vincent Andrew Prinzo, Greensboro, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 972 days.

(21) Appl. No.: 17/552,892

(22) Filed: Dec. 16, 2021

(65) Prior Publication Data

US 2023/0189702 A1    Jun. 22, 2023

(51) Int. Cl.
| | |
|---|---|
| A01D 34/00 | (2006.01) |
| A01D 34/69 | (2006.01) |
| A01D 34/74 | (2006.01) |
| A01D 34/78 | (2006.01) |
| A01D 69/02 | (2006.01) |
| A01D 101/00 | (2006.01) |
| B60L 15/20 | (2006.01) |
| B60L 58/12 | (2019.01) |

(52) U.S. Cl.
CPC .......... *A01D 34/006* (2013.01); *A01D 34/69* (2013.01); *A01D 34/74* (2013.01); *A01D 69/02* (2013.01); *B60L 15/20* (2013.01); *B60L 58/12* (2019.02); *A01D 34/78* (2013.01); *A01D 2101/00* (2013.01); *B60L 2240/54* (2013.01); *B60L 2250/16* (2013.01)

(58) Field of Classification Search
CPC ...... A01D 34/006; A01D 34/69; A01D 34/74; A01D 69/02; A01D 34/78; A01D 2101/00; A01D 34/008; A01D 34/66; B60L 15/20; B60L 58/12; B60L 2240/54; B60L 2250/16; B60L 15/2045; B60L 2200/40; B60L 2240/12; B60L 2260/54; B60L 1/003
See application file for complete search history.

(56) References Cited

U.S. PATENT DOCUMENTS

| | | | |
|---|---|---|---|
| 5,937,622 A | 8/1999 | Carrier et al. | |
| 8,863,485 B2 | 10/2014 | Pitcel et al. | |
| 9,192,096 B2 | 11/2015 | Harris, III | |
| 9,635,806 B2 | 5/2017 | Waitt et al. | |
| 9,861,035 B2 | 1/2018 | Kruckeberg et al. | |
| 2004/0221561 A1* | 11/2004 | Koehn | A01D 34/662 56/15.9 |

(Continued)

FOREIGN PATENT DOCUMENTS

| | | | | |
|---|---|---|---|---|
| EP | 2425701 A2 | * | 3/2012 | ........... A01D 34/008 |
| EP | 2767150 A1 | * | 8/2014 | ........... A01D 34/008 |

(Continued)

*Primary Examiner* — Dale W Hilgendorf
*Assistant Examiner* — Frank T Glenn, III
(74) *Attorney, Agent, or Firm* — IKENEALY VAIDYA LLP (57) ABSTRACT

An adaptive cutting system for a electric lawnmower including a battery, a motor, a controller, a drive assembly, and a blade. The controller can be configured to adjust at least one of a cutting height of the blade and a ground speed output by the drive assembly based on a predetermined run time and a state of charge of the battery.

19 Claims, 5 Drawing Sheets

(56) References Cited

U.S. PATENT DOCUMENTS

| | | | |
|---|---|---|---|
| 2011/0254692 A1* | 10/2011 | Furuta | H04M 1/72412 |
| | | | 340/636.1 |
| 2014/0013722 A1* | 1/2014 | Pitcel | B60W 20/20 |
| | | | 180/65.23 |
| 2015/0006025 A1 | 1/2015 | Rhoades et al. | |
| 2017/0156262 A1* | 6/2017 | Reichard | A01D 34/64 |
| 2017/0265381 A1* | 9/2017 | Kuriyagawa | A01D 34/64 |
| 2018/0029589 A1* | 2/2018 | Dextreit | F02D 41/065 |
| 2018/0065621 A1* | 3/2018 | Merkle | B60L 50/15 |
| 2022/0007571 A1* | 1/2022 | Foster | A01D 34/008 |
| 2022/0169235 A1* | 6/2022 | Cheng | G01C 21/3469 |
| 2023/0144284 A1* | 5/2023 | Lee | B60L 15/2045 |
| | | | 701/22 |

FOREIGN PATENT DOCUMENTS

| | | | | |
|---|---|---|---|---|
| EP | 2783561 A1 * | 10/2014 | | A01D 34/008 |
| WO | WO2008048618 A2 | 4/2008 | | |

* cited by examiner

ADAPTIVE CUTTING SYSTEM, A LAWNMOWER INCLUDING SAME, AND METHOD FOR ADJUSTING A LAWNMOWER

BACKGROUND

The disclosed subject matter relates to an adaptive cutting system that can be embodied in a lawnmower. More particularly, the disclosed subject matter relates to methods and apparatus that automatically control cutting height and drive speed of the lawnmower.

Lawnmowers can be manually propelled, such as a push mower, or they can be self-propelled. Push mowers can rely on the force generated by an operator to move. Self-propelled lawnmowers can have a power source such as a motor to move the lawnmower. Various categories of lawnmowers can include walk-behind, stand-on, or riding mowers. These categories of lawnmowers typically allow an operator to choose operational settings of the lawnmower.

SUMMARY

Some embodiments are directed to an adaptive cutting system for an electric powered lawnmower. According to one aspect of the disclosed subject matter, an adaptive cutting system, can include a housing, a battery located at the housing, a motor electrically connected to the battery, a drive assembly connected to the motor and configured to move the system relative to ground at a predetermined speed, a blade located adjacent the housing, and a controller configured to adjust at least one of a cutting height of the blade and a ground speed output by the drive assembly based on a predetermined run time and a state of charge of the battery.

According to another aspect of the disclosed subject matter, a lawnmower can include a deck, a blade rotatably supported in the deck, a battery, an electric motor in electrical communication with the battery, a plurality of wheels, a drive assembly connected to at least one of the plurality of wheels, and configured to drive the at least one of the plurality of wheels, a lift assembly connected to the deck, and a controller in electrical communication with the battery, the drive assembly, and the lift assembly, the controller configured to adjust at least one of a cutting height of the blade and a ground speed output by the drive assembly based on a predetermined run time and a state of charge of the battery.

According to another aspect of the disclosed subject matter, a method of managing power consumption of an electric lawnmower having a controller can include calculating via the controller an estimated run time for the electric lawnmower, and at least one of, raising a cutting height of the lawnmower, and slowing the ground speed of the lawnmower, when the controller determines that the estimated run time is less than a predetermined time.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Lawnmowers can be powered electrically such as with a DC system. A DC powered lawnmower can operate from power reserves stored in one or more batteries. When the battery power has been entirely consumed by the lawnmower, the battery(ies) will need to be recharged before the lawnmower can operate again. The recharging cycle can take several hours to completely recharge the battery(ies). An operator of a DC lawnmower can perceive discomfort with the possibility that the battery(ies) will be fully discharged before the mowing job is complete.

A lawnmower 10 made in accordance with the principles of the disclosed subject matter can include an adaptive cutting system that can monitor and adjust the DC power consumed by the lawnmower 10 during its operation such that the lawnmower 10 can be usable for a period of time that is selected by the operator of the lawnmower 10. Thus, the adaptive cutting system can enhance the operator's perception that power presently stored in the battery(ies) will be sufficient to complete the desired job. Accordingly, there is a need for an adaptive cutting system that can provide a user a sense of security that a DC powered lawnmower will operate for a requested period of time with the available power reserve in the battery.

Exemplary embodiments of a lawnmower made in accordance with principles of the disclosed subject matter can include but are not limited to a walk-behind lawnmower, a ride-on or riding lawnmower, a lawn tractor, and a zero-turn mower.

Figure 1:
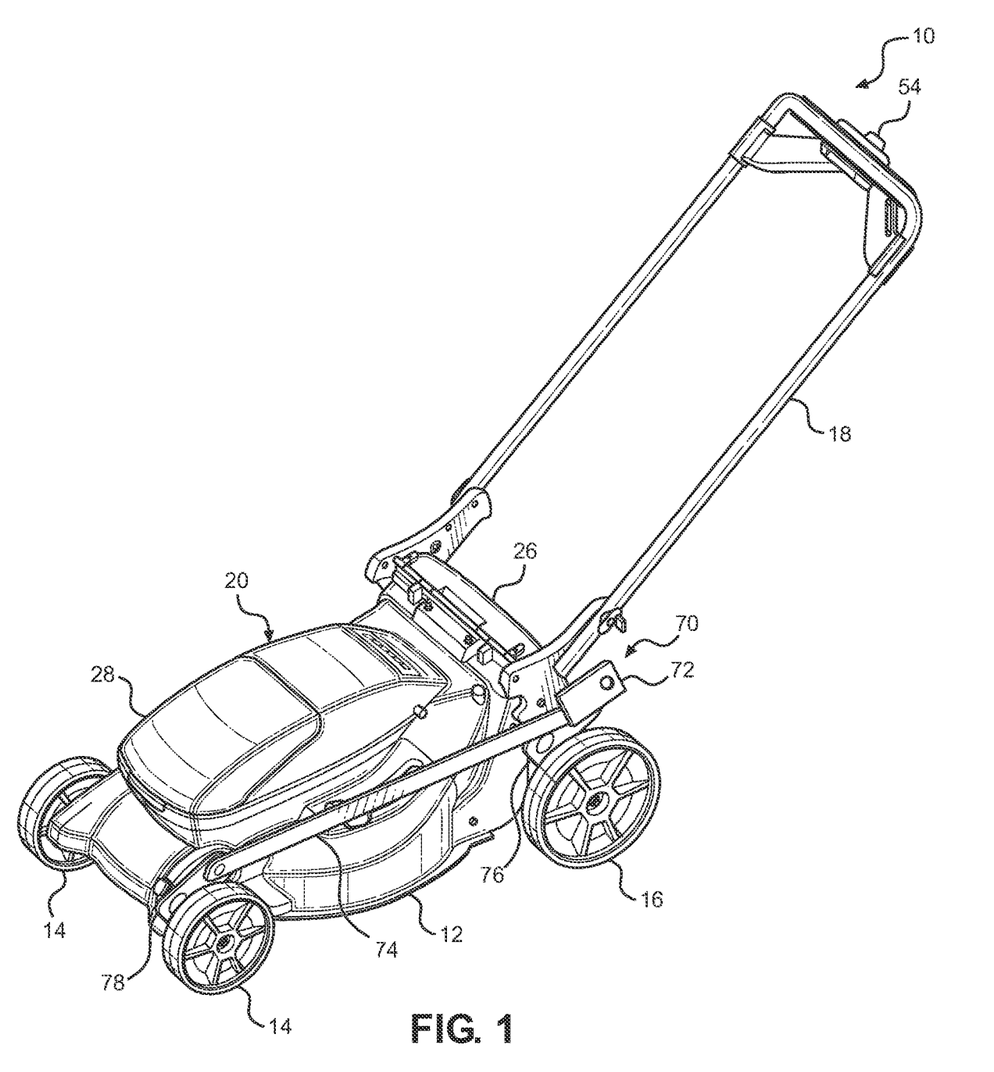
FIG. 1 is a perspective view of a lawnmower made in accordance with principles of the disclosed subject matter.
Figure 2:
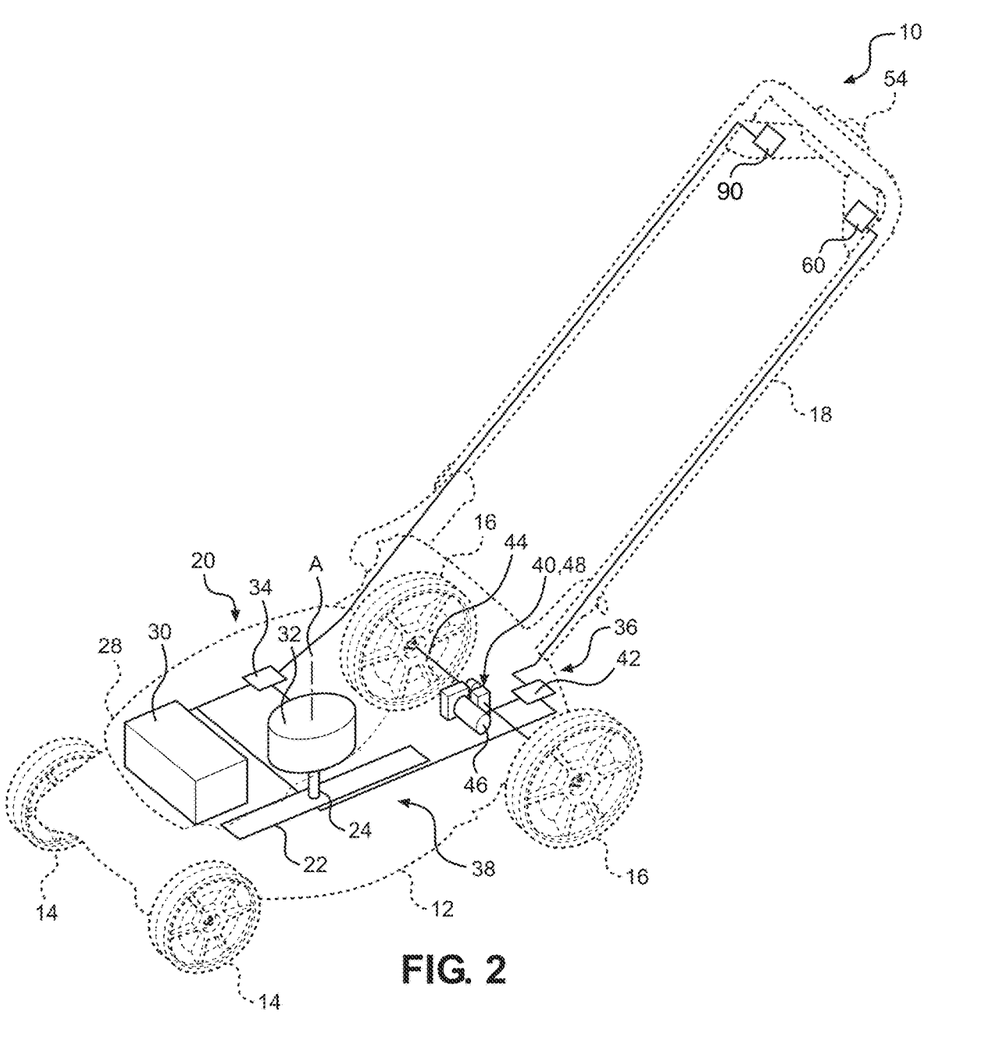
FIG. 2 is perspective view of a power distribution assembly for operating a cutting blade and propelling the lawnmower of FIG. 1, with exterior portions of the lawnmower shown in phantom.

FIG. 1 illustrates an exemplary embodiment of a lawnmower 10 configured as a walk-behind self-propelled lawnmower 10 that can include an adaptive cutting system. The lawnmower 10 can include a deck 12, a pair of front wheels 14, a pair of rear wheels 16, a handle 18, a lift assembly 70, a power distribution assembly 20, and an input structure 54. The rear wheel 16 on the right side of the lawnmower is obstructed from view in FIG. 1 by the deck 12. FIG. 2 shows the right rear wheel 16 in phantom.

The deck 12 can be referred to as a cutter housing or a mower deck or as a cutter deck. Referring to FIG. 1, the deck 12 can include an opening at a rear end 26 of the deck 12. The lawnmower 10 can include a collection bag that can be selectively attached to and detached from the rear end 26. The opening and the collection bag are omitted from the drawings for simplicity and clarity of the drawing figures.

The collection bag can be in communication with the opening such that vegetation clippings produced by the blade 22 can be collected in the collection bag.

At least one input structure 54 can be mounted on the handle 18 (or other location). Referring to FIGS. 1-2, the input structure 54 can include one or more switches (buttons) or one or more dials or one or more levers or any combination of a switch, a lever and a dial. The input structure 54 can include a mechanical structure, an electromechanical structure or an electronic structure. For example, the input structure 54 can be a rotary encoder switch mounted on the handle 18.

Referring to FIG. 1, the lift assembly 70 can be referred to as a height adjustment mechanism. The lift assembly 70 can include an actuator 72, a connecting structure 74, and a plurality of levers 76, 78. The lift assembly can include a first lever 76 connected to one of the rear wheels 16 and a second lever 78 connected to one of the front wheels 14. The connecting structure 74 can connect to each of the levers 76, 78 and to the actuator 72. As will be discussed in further detail below, the lift assembly 70 can be configured to adjust (for example, reduce) the cutting load on the blade motor 32 of the lawnmower 10 by changing (for example, increasing) the cutting height of the blade 22 relative to the ground.

In the embodiment shown in FIG. 1, the lift assembly 70 can be configured to change the cutting height by increasing or decreasing the distance of the front and rear wheels 14, 16 relative to the deck 12 in a direction substantially parallel to a rotary axis A of the blade 22. The lift assembly 70 can be referred to as a component of the lawnmower 10 that is separate from but connected to and driven by the power distribution assembly 20. Alternatively, the lift assembly 70 can be referred to as a component of the power distribution assembly 20.

Figure 3:
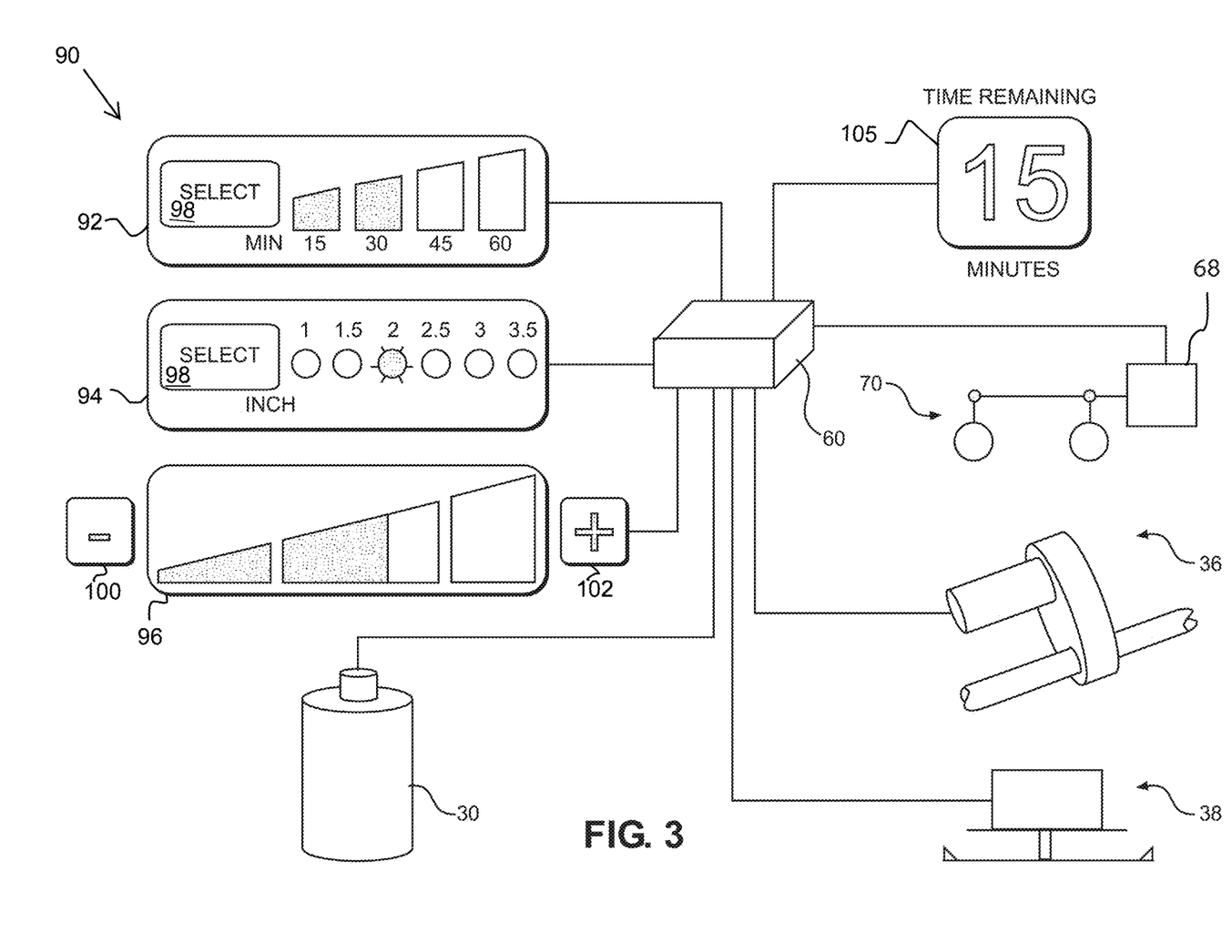
FIG. 3 is a schematic diagram of a power control module for the lawnmower of FIG. 1.

The connecting structure 74 can connect the levers 76, 78 to each other and to the actuator 72. The connecting structure 74 can connect to the deck 12 or wheels 14, 16 of the lawnmower 10 directly or through any number of intermediary linkages. In the embodiment shown in FIG. 1, the levers 76, 78 can connect to the deck 12. In alternate embodiments, the connecting structure 74 can connect to a frame 80 of the lawnmower 10. Referring to FIG. 1, the connecting structure 74 can include a rod or pin attached to the first lever 76 on one end and a rod or pin attached the second lever 78 and the actuator 72 on the other end to provide a relative pivoting motion about the rod or pin. The connecting structure 74 can connect directly to the actuator 72 or connect to an output member attached to the actuator 72. Referring to FIG. 3, the actuator 72 can be in electrical communication with the main controller 60 and located anywhere on the lawnmower 10 that allows actuation of the connecting structure 74 such that the levers 76, 78 can pivot relative to the deck 12 to change the cutting height of the blade 22 relative to the ground.

The actuator 72 can be connected to the connecting structure 74 and driven directly by the main controller 60. The lift assembly 70 can be configured to change the cutting height of the lawnmower 10 based on an input from the operator or a signal from the main controller 60. The lift assembly 70 can also be configured to change the cutting height of the lawnmower 10 based on one or more calculations by the main controller 60. For example, the main controller 60 can be configured to signal the lift assembly 70 to raise the cutting height of the lawnmower 10 when the main controller 60 determines the state of charge of the battery assembly 30 is less than a threshold power reserve associated with current cutting height and run time selected by the operator.

The lift assembly 70 can be configured to change the cutting height to one of a plurality of predetermined cutting heights. For example, the lift assembly 70 can be configured to change the cutting height from a current cutting height to a raised cutting height that is one predetermined increment higher than the current cutting height. FIG. 3 shows that the operator can select from a plurality of cutting heights that range from a minimum cutting height of 1 inch to a maximum cutting height of 3.5 inches in increments of 0.5 inch. The main controller 60 can be configured to signal the lift assembly 70 to raise the current cutting height by 0.5 inch from the operator's selected cutting height when the lift assembly 70 receives a signal from the main controller 60. Alternatively, the lift assembly 70 can be configured to change the cutting height to a predetermined one of the cutting heights, such as but not limited to the maximum cutting height, independent of the cutting height originally selected by the operator.

In alternate embodiments the lift assembly 70 can include an actuator driver. The actuator 72 can be driven by the actuator driver, which is in electrical communication with the main controller 60. The actuator driver can also be configured to control the voltage or current output by the battery 30, and to supply the voltage or current to the actuator 72 using the one or more power transistors based on one or more inputs to the main controller 60 by the operator of the lawnmower 10.

FIG. 2 schematically illustrates exemplary components of the lawnmower 10. The lawnmower 10 can include a housing 28 (shown in phantom), a battery 30, a blade assembly 38, a drive assembly 36, and a power distribution assembly 20. Referring to FIGS. 1 and 2, the housing 28 can contain a battery 30, a blade assembly 38 and a blade motor driver 34. The drive assembly 36 can be spaced away from the housing 28.

The battery 30 can include one battery cell or a plurality of battery cells. The plurality of battery cells can be electrically connected together in any appropriate manner to achieve a desired voltage output and/or a desired power output.

The blade assembly 38 can include a blade 22, a blade motor 32, a blade motor driver 34, and a blade shaft 24 connected to each of the blade 22 and the blade motor 32. The blade motor 32 can be configured to rotate the blade shaft 24 and the blade 22 in the deck 12 about a blade axis A. The blade shaft 24 can be connected to and driven by blade motor 32 that is either directly driven by the power distribution assembly 20 or indirectly driven by the blade motor driver 34 in electrical communication with the power distribution assembly 20.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor driver 34 with information regarding the temperature, rotational speed, power output, etc., of the blade motor 32. The outer rotor of the blade motor 32 can be directly connected to the shaft 24 in any appropriate manner such that the blade motor 32 can cause the blade shaft 24 to rotate.

The blade motor driver 34 can be in electrical communication with each of the battery 30, the blade motor 32, and a main controller 60 of the power distribution assembly 20.

The blade motor driver 34 can be configured to convert power from the battery 30 into output power supplied to the blade motor 32. The blade motor driver 34 can be configured to monitor the operational conditions of the blade motor 32 and the battery 30.

The blade motor driver 34 can also be configured to control the voltage or current output by the battery 30, and to supply the voltage or current to the blade motor 32 using the one or more power transistors based on one or more inputs received by the main controller 60 from the operator of the lawnmower 10.

The blade motor driver 34 can be configured to initiate, adjust or terminate supply of voltage or current from the battery 30 to the blade motor 32 based on inputs received from the main controller 60, the battery 30 and the blade motor 32.

The drive assembly 36 can be mounted to the deck 12 at a position that is underneath the deck 12. The drive assembly 36 can include a drive transmission 40 and a propulsion motor driver 42. The propulsion motor driver 42 can be in electrical communication with each of the battery 30 and the drive transmission 40. A drive shaft 44 can be connected to each of the drive transmission 40 and the rear wheels 16 in any appropriate manner such that the drive transmission 40 can cause the drive shaft 44 to rotate, which in turn can cause the rear wheels 16 to rotate.

The drive transmission 40 can also include a propulsion motor 46 and a gear transmission 48 connecting the propulsion motor 46 to the drive shaft 44. The propulsion motor 46 can be a direct current electric motor or an alternating current electric motor. The propulsion motor 46 can include one or more sensors that provide the propulsion motor driver 42 with information regarding the temperature, rotational speed, power output, etc., of the propulsion motor 46.

The propulsion motor driver 42 can be in electrical communication with each of the battery 30, the propulsion motor 46, and the main controller 60. The propulsion motor driver 42 can be configured to convert power from the battery 30 into output power supplied to the propulsion motor 46. The propulsion motor driver 42 can be configured to monitor the operational conditions of the propulsion motor 46 and the battery 30.

The propulsion motor driver 42 can also be configured to control the voltage or current output by the battery 30, and to supply the voltage or current to the propulsion motor 46 based on one or more signals from the main controller 60 and/or one or more inputs by the operator of the lawnmower 10 using the one or more power transistors.

The propulsion motor driver 42 can be configured to initiate, adjust or terminate supply of voltage or current from the battery 30 to the propulsion motor 46 based on inputs received from the battery 30, the propulsion motor 46, the main controller 60, and one or more input structures mounted on the handle 18 or other appropriate location.

The power distribution assembly 20 can include a battery 30 and the main controller 60. As will be discussed in further detail below, the power distribution assembly 20 can be configured to distribute power from the battery 30 to each of the drive assembly 36, the lift assembly 70, and the blade assembly 38 based on one or more operator inputs such as but not limited to the input structure 54.

The power distribution assembly 20 can be configured to drive the rear wheels 16 by adjusting the ground speed output of the drive assembly 36 to increase or decrease the ground speed of the lawnmower 10. The power distribution assembly 20 can be configured to actuate the lift assembly 70 to change the cutting height of the blade 22 by raising or lowering the height of the deck 12 relative to the cutting surface. The power distribution assembly 20 can be configured to drive the blade motor 32 to rotate the blade shaft 24 and the blade 22 in the deck 12 about the blade axis A.

The main controller 60 can be mounted in the handle 18. Alternate embodiments can include a main controller 60 mounted at any location in or on the handle 18 or spaced away from the handle 18. Alternate embodiments can include the main controller 60 mounted in any appropriate position on the lawnmower 10 in consideration of packaging space, desired performance specifications, ease of assembly, and/or ease of maintenance, etc.

The main controller 60 can be in electrical communication with each of the drive assembly 36, the lift assembly 70, the blade assembly 38, the battery 30, and the input structure 54. The main controller 60 can be configured to receive operator inputs from the input structure 54 and control each of the drive assembly 36 and lift assembly 70 based on one or more calculations performed by the controller 60 and based on the operator inputs and the state of charge of the battery 30. For example, the main controller 60 can receive an operator input of a requested run time and adjust a cutting load of the lawnmower 10 by changing the cutting height and the ground speed of the lawnmower 10. The main controller 60 can be configured to achieve the adjustments to the cutting settings by actuating the lift assembly 70 to raise the blade 22 relative to the ground and reducing the ground speed output of the drive assembly 36.

The main controller 60 can obtain operational settings and power consumption information from each of the blade assembly 38, the drive assembly 36, and the lift assembly 70. The main controller 60 can receive the information directly from each of the blade assembly 38, the drive assembly 36, and the lift assembly 70 or from respective sensors in each assembly. The main controller 60 can read or receive information from the battery 30 relating to the state of charge of battery 30, the total power reserve in the battery 30, and/or the power consumption rate of each of the assemblies 36, 38, 70 on the battery 30. The main controller 60 can also receive information related to weather conditions (temperature, rainfall, etc.), humidity, location, grass height via user interface inputs, internet connection inputs, and/or sensor inputs.

When the estimated power consumption for the remaining time is less than or equal to the available battery 30 power, the main controller 60 can maintain the current ground speed and the current cutting height or if the drive assembly and lift assembly have already been adjusted away from the requested operator input, return the current ground speed to the requested ground speed and the current cutting height to the requested cutting height.

The battery 30 can be a battery pack and can include at least one battery cell and a case that houses the at least one battery cell. The battery cell can be configured to store electricity and supply electricity to each of the blade motor 32, the propulsion motor 46, and the actuator 72. A battery sensor can be in electrical communication with the battery 30 or included as part of the battery 30. The battery sensor can be in two-way electrical communication with the main controller 60. For example, the battery sensor can measure a state of charge of the battery 30 and output the state of charge to the main controller 60. Alternatively, the main controller 60 can monitor the battery sensor and obtain the state of charge of the battery 30 at predetermined intervals or upon request based on operator input. The battery sensor or main controller 60 can measure, calculate, or determine state of charge of the battery 30 in any way known to those of ordinary skill in the art including, but not limited to, a chemical method, a voltage method, a current integration method, using Kalman filtering, a pressure method, or any combination thereof.

The input structure 54 can be configured to receive operator inputs and facilitate control of at least one of the power distribution assembly 20, the blade assembly 38, the drive assembly 36, and the lift assembly 70 by the operator of the lawnmower 10. The input structure 54 can include a display 90 that can include a run time display 92, a cutting height display 94, a ground speed display 96, and a time remaining display 105. Each of the run time display 92 and the cutting height display 94 can include a selection button 98 for choosing a requested run time and requested cutting height on the input structure 54. The ground speed display 96 can include a decrease button 100 and an increase button 102 to set the requested ground speed of the lawnmower 10. The input structure 54 can be configured as a single display 90 that can include each of the run time display 92, the cutting height display 94, and the ground speed display 96 or the input structure 54 can be configured as having multiple displays with each display 90 having one of or any combination of the run time display 92, the cutting height display 94, and the ground speed display 96 as well as other displays (weather, location, current grass height, etc.) depending on application and desire. In one embodiment, grass height can be calculated by the controller 60 by calculating a time from last cutting and possibly including intervening weather conditions, etc., to determine the grass height which, in turn, can be factored into calculation of the estimated load on the battery 30 required to cut the lawn.

The input structure 54 can be configured to permit the operator of the lawnmower to set a requested run time from a range of possible run times at which the lawnmower 10 can operate. The input structure 54 can be configured to permit the operator of the lawnmower 10 to set a requested cutting height from a range of possible cutting heights at which the lift assembly 70 can adjust the lawnmower 10. The input structure 54 can be configured to permit the operator of the lawnmower 10 to set a requested maximum ground speed value from a range of possible maximum ground speed values at which the drive assembly 36 can propel the lawnmower 10. The input structure 54 can also be configured such that one or more selection buttons 98 can permit the operator to set the requested run time and the cutting height and the decrease and increase buttons 100, 102 can permit the operator to set the requested ground speed.

The input structure 54 can permit an operator to enter values for the requested run time, requested cutting height, and the requested ground speed or the input structure 54 can permit an operator to choose from one of a plurality of predetermined run times, one of a plurality of predetermined cutting heights, and one of a plurality of predetermined ground speeds.

Referring to an exemplary embodiment shown in FIG. 3, the requested run time can be chosen in the run time display 92 of the display 90 from one of a selection of predetermined quarter-hours, the requested cutting height can be chosen in the cutting height display 94 of the display 90 from one of a selection of predetermined cutting heights that differ by half inch, and the requested ground speed can be chosen in the ground speed display portion 96 of the display 90 from one of a graphical representation of a percentage of the lawnmower's maximum operational speed. The time remaining portion 105 can show on the display 90 the estimated time remaining calculated by the main controller 60.

Any acceptable unit for measuring time can be used for the requested run time. Any acceptable unit for measuring height can be used for the requested cutting height. Any acceptable measurement of speed can be used for the requested ground speed including, but not limited to miles per hour, kilometers per hour, or percentage of maximum speed.

Referring to FIG. 3, the lawnmower 10 can include a main controller 60. The main controller 60 can also be referred to as a power control module or power distribution unit. In the exemplary embodiment shown in FIG. 3, the main controller 60 can be in electrical communication with the battery 30, the blade motor driver 34, the propulsion motor driver 42, the actuator 72, and the input structure 54.

The main controller 60 can be configured to signal the propulsion motor driver 42 to initiate, adjust or terminate supply of voltage or current from the battery 30 to the propulsion motor 46 based on inputs received from any of the battery 30, the propulsion motor 46, the actuator 72, and the input structure 54.

The main controller 60 can be configured to signal the actuator 72 to initiate, adjust or terminate supply of voltage or current from the battery 30 to the actuator 72 based on inputs received from any of the battery 30, the propulsion motor 46, the actuator 72, and the input structure 54.

The main controller 60 can also be configured to receive operator inputs from the input structure 54 related to at least one of a predetermined run time, a requested cutting height, a requested ground speed as well as other information such as weather, humidity, grass height, location of mower, mowing plan (i.e., area to be cut as well as elevation changes throughout that might drain power), etc.

The main controller 60 can be configured to adjust at least one of a cutting height of the blade 22 and a ground speed output by the drive assembly 36 based on a predetermined run time and a state of charge of the battery 30 as well as the other variables noted above, if desired. In one embodiment, the main controller 60 can be configured to adjust the ground speed output by the drive assembly 36 first, and then if there is insufficient battery 30 power to operate the lawnmower 10 for the predetermined run time, adjust the cutting height of the blade 22 relative to the cutting surface.

The main controller 60 can be configured to calculate an estimated run time based on a power consumption from the battery 30 and the state of charge of the battery 30 (as well as other variables noted above, if desired). The power consumption can be current power consumption based on current operating settings of the lawnmower or it can be estimated power consumption based on the operator's requested inputs. The power consumption can be a total power consumption drawn from the battery 30 to other components of the lawnmower 10 or the power consumption can be a rate of consumption that is based on how much power other components of the lawnmower 10 are using from the battery 30. For example, the power consumption can be the amount of power the blade assembly 38 and the drive assembly 36 have drawn from the battery 30 during operation of the lawnmower 10. The estimated run time can be expressed as a sum of the total run time that has already occurred added to the estimated run time remaining based on the power consumption from the battery 30 and the state of charge of the battery 30.

The main controller 60 can be configured to change a current cutting height of the blade to a second cutting height, where the second cutting height is greater than the current cutting height, when the estimated run time is less than the predetermined run time. The second cutting height can be a specific predetermined cutting height that is higher than the current cutting height. The second cutting height can be a cutting height that is a predetermined increment higher than the current cutting height. The predetermined increment can be one of a plurality of predetermined increments. For example, the second cutting height can be one half inch higher than the current cutting height as long as the current cutting height is not at a maximum cutting height of a plurality of cutting heights. Alternatively, the second cutting height can be a calculated cutting height that ensures that the power consumption of the lawnmower 10 will not deplete the battery 30 before the requested run time has occurred. Put another way, the second cutting height can ensure that the lawnmower's estimated run time is equal to or greater than the requested run time.

The main controller 60 can also be configured to change a current ground speed output by the drive assembly to a second ground speed, where the second ground speed is slower than the current ground speed, when the estimated run time is less than the predetermined run time. The second ground speed can be a specific predetermined ground speed that is slower than the current ground speed. The second ground speed can be a ground speed that is a predetermined increment slower than the current ground speed. The predetermined increment can be one of a plurality of predetermined increments. For example, the second ground speed can be one mile per hour slower than the current ground speed as long as the current ground speed is not at a minimum ground speed of a plurality of possible ground speeds. Alternatively, the second ground speed can be a calculated ground speed that ensures that the power consumption of the lawnmower 10 will not deplete the battery 30 before the requested run time has occurred. Put another way, the second ground speed can ensure that the lawnmower's estimated run time is equal to or greater than the requested run time.

The main controller 60 can be configured to set at least one of an initial ground speed output by the drive assembly 36 and an initial cutting height of the blade 22 based on the predetermined run time, the state of charge of the battery, and at least one of a requested cutting height and a requested ground speed (and can also be based on other variables, as noted above). The operator can also select which change in variable is preferred to achieve the desired operation (i.e., whether slower ground speed is preferable to a change in cutting height in order to achieve the desired lawnmower operation). In operation, the main controller 60 can compare the estimated run time of the lawnmower 10 based on the operator's requested inputs with the operator's requested run time. If the estimated run time is greater than or equal to the requested run time, the main controller 60 can signal to the propulsion motor driver 42 to initiate or adjust supply of voltage or current from the battery 30 to the propulsion motor 46 to achieve the operator's requested ground speed and the main controller 60 can signal to the actuator 72 to change the cutting height of the lawnmower 10 to the operator's requested cutting height. If the estimated run time is less than the operator's requested run time, the main controller 60 can signal to the propulsion motor drive 42 to initiate or adjust supply of voltage or current from the battery 30 to the propulsion motor 46 to reduce the ground speed relative to the requested ground speed and/or the main controller 60 can signal to the actuator 72 to raise the cutting height of the lawnmower 10 relative to the requested cutting height. Alternatively, the main controller 60 can set an initial cutting height of the blade 22 and an initial ground speed output of the drive assembly 36 based on the predetermined run time and the state of charge of the battery 30 such that the state of charge of the battery 30 will be greater than zero for the predetermined run time.

The main controller 60 can be configured to output to a display 90 on the input structure 54 a remaining run time based on at least one of the predetermined run time, a power consumption from the battery, and the state of charge of the battery (as well as other variables noted above). The display 90 can be configured to display the remaining run time on a time remaining portion 105.

Referring to FIG. 3, the input structure 54 can provide the main controller 60 with operator inputs that can include, but are not limited to, a requested run time, a requested cutting height, a requested ground speed, and a preference of which variable to change at which timing or sequencing in order to meet desired operation characteristics of the battery 30 and lawnmower 10. The main controller 60 can output to the input structure 54 graphical representations of the requested run time, the requested cutting height, the requested ground speed, and the estimated time remaining.

Figure 4:
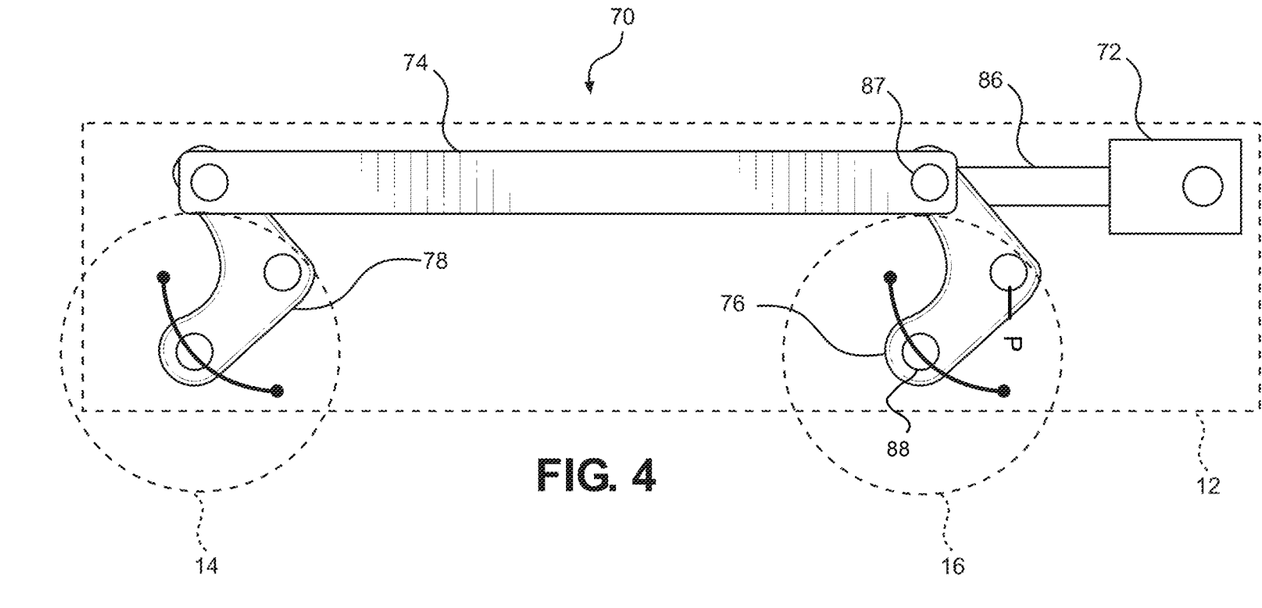
FIG. 4 is a side view of the lift assembly of the lawnmower of FIG. 1, with the wheels and deck shown in phantom.

Referring to FIG. 4, there is shown a side view of one exemplary embodiment of a lift assembly 70. The lift assembly 70 can include two cams 76, 78 and a connecting structure 74 that is a link arm. FIG. 4 illustrates how rotation of all cams of the lift assembly 70 is coordinated. Each cam 76, 78 is pivotably connected to an end of the connecting structure 74 and to one of either the front or rear wheels 14,16 (shown in phantom) at wheel axel point 88. The cams 76, 78 can be operationally connected to each other via connecting structure 74 and each cam 76, 78 can pivot about pivot point P where each cam 76, 78 is configured to connect to the deck 12 of the lawnmower 10. Accordingly, rotation of the cam 76 can result in rotation of the cam 78. Rotation of the cam 76 can occur upon driving the actuator 72 connected to the connecting structure 74 at connection point 87 through an output shaft 86. As a result of the pivoting about point P of the cam 76, the distance of the deck 12 relative to the wheels 14,16 in a direction substantially parallel with the rotary axis A of the blade 22 can increase or decrease to change the cutting height of the lawnmower 10.

On the other side of the lawnmower 10, the other one of either the front or rear wheels 14, 16 can be connected to a lever that is pivotably connected to the deck 12 in a similar manner. Thus, rotation of the cams 76, 78 can change the distance of the deck 12 relative to the wheels 14,16 on the other side of the lawnmower 10 in a direction substantially parallel with the rotary axis A of the blade 22.

In alternate embodiments, the lawnmower 10 can be a riding or ride-on lawnmower 10 and the lift assembly can be configured to connect to a deck 12 and a frame 80 of the riding lawnmower 10. In alternate embodiments, driving the actuator 72 can change the distance between the deck 12 and the frame 80 to change the cutting height of the lawnmower 10. Other alternate linkage assemblies can be used for particular applications, such as gear driven linkages, pneumatic, hydraulic, or spring driven mechanisms, or ratchet and pawl mechanisms. In addition, the height of the blade with respect to the ground can be adjusted by movement of the blade 22 itself. Electric, hydraulic, pneumatic or other motors or valves can also be used to cause the deck 12 or blade 12 to move, up and down, with respect to the ground surface to adjust blade height, with or without a linkage between the motors or valves and the blade 22, deck 12, or wheels 14, 16.

Figure 5:
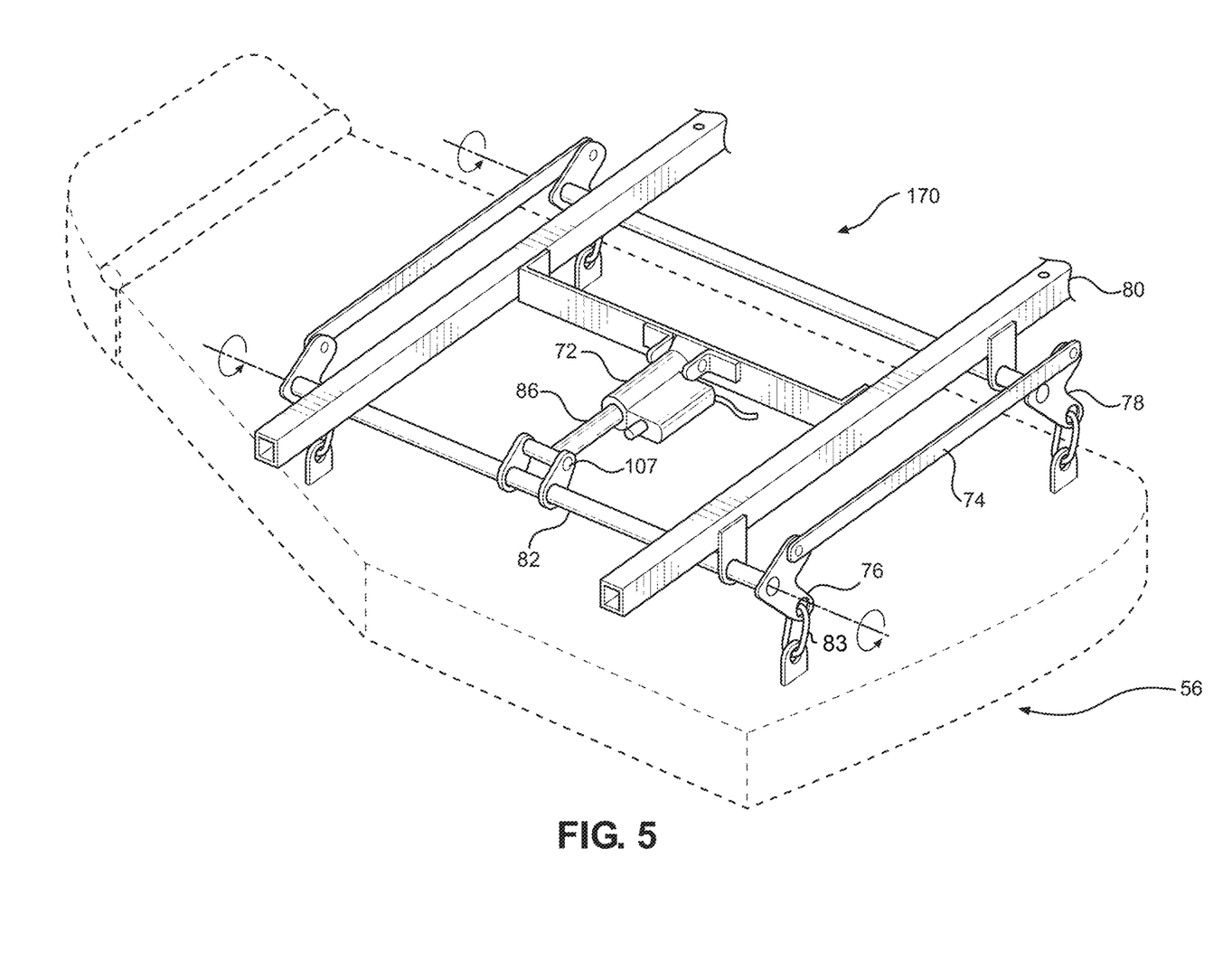
FIG. 5 is a top perspective view of an embodiment of a lift assembly with a deck and frame, made in accordance with principles of the disclosed subject matter.

Referring to FIG. 5, there is shown a top perspective view of another exemplary embodiment of a lift assembly 170 configured to connect to a frame 80 of a riding lawnmower 10 made in accordance with principles of the disclosure.

The lift assembly 170 can be configured to mirror on a left and right side of the frame 80 with an actuator 72 disposed in a central position between the left and ride sides of the frame 80.

The deck (or mower housing) 56 can be of various shapes and constructions. Various additional mower housing types can be used with the lift assembly 170 of the disclosure.

The lift assembly 170 can include an actuator 72, a connecting structure 74, and a plurality of cams 76, 78. The connecting structure 74 can include a pivot bar 82.

The connecting structure 74 can connect the first cam 76 to the second cam 78. As a result of such connection, rotation of the first cam 76 can cause rotation of second cam 78. In other words, the first cam 76 can be mechanically connected to the second cam 78 so that the cams 76, 78 rotate together.

The output shaft 86 of the linear actuator 72 can be configured to impart rotation to the pivot bar 82 about a rotational (longitudinal) axis of the pivot bar 82 The pivot bar 82 can include a pair of flanges through which a pin aperture receives a pin 107. The pin 107 is driven by the output shaft 86 to rotate that pivot bar 82 during actuation of the actuator 72.

As shown in FIG. 5, the first cam 76 can be affixed to the pivot bar 82, at a respective attachment point so as to rotate with the pivot bar 82.

The plurality of cams can include mower housing attachment elements 83 to support the mower housing 56 at varying height positions relative to the frame 80 or ground, and dependent on rotational positions of the cams 76, 78.

The adaptive cutting system can begin the adjustment of a cutting setting of the lawnmower 10 when initiated by any of the operator, powering on the lawnmower 10 from a sleep state, or receiving a selection of requested operator inputs.

The main controller 60 can begin the adjustment of a cutting setting of the lawnmower 10 based on operator input or based on memory as well as certain sensor inputs that can include: location of lawnmower (which lawn is being cut), weather conditions, time of year, altitude, as well as other variables that may dictate power usage and initial cutting settings for the lawnmower 10. The main controller 60 can raise the cutting height of the lawnmower 10 and/or slow the ground speed of the lawnmower 10 based on a predetermined time input and a state of charge of the battery 30. The operator can use input structure 54 to select any one of a predetermined time input from a plurality of predetermined times, a predetermined cutting height from a plurality of predetermined cutting heights, and a predetermined cutting speed from a plurality of predetermined cutting speeds.

Each of the drivers and the main controller 60 can be referred to as an electronic control unit ("ECU") or as a central processing unit ("CPU") or as a microcontroller. The drivers 34, 42, 68 and the main controller 60 can be configured with hardware, with or without software, to perform the assigned task(s). The drivers 34, 42, 68 and the main controller 60 can include or be electrically connected to any appropriate memory device that can store and retrieve programs and/or data for use by the drivers 34, 42, 68 and the main controller 60. Although the propulsion motor driver 42, blade motor driver 34, actuator driver 68, and the main controller 60 are referred to separately, a single controller (instead of separate drivers 42, 34, 68 and controller 60) can be used to perform the same or similar functions as each of the drivers 34, 42, 68 and the main controller 60.

Electrical communication lines (not numbered) can connect each of the drivers 34, 42, 68 and the main controller 60 to one or more components of the power distribution assembly 20 in any appropriate manner. Electrical communication can be either one-way communication or two-way communication and can be networked or not networked, and can be wireless if desired. The battery sensor can be configured with hardware, with or without software, to perform the assigned task(s). The battery sensor can include one or more smart sensors such that the battery sensor can process the raw data collected by battery sensor prior to transmission to the main controller 60 or the battery sensor can be configured as a simple sensor that passes the raw data directly to the main controller 60 without any manipulation of the raw data. The battery sensor can be configured to send data to the main controller 60, with or without a prompt from the main controller 60.

While certain embodiments of the invention are described above, it should be understood that the invention can be embodied and configured in many different ways without departing from the spirit and scope of the invention.

For example, embodiments are disclosed above in the context of a lawnmower 10 shown in FIG. 1. However, alternate embodiments can be configured as any appropriate lawnmower including a ride-on or ride-along lawnmower or a lawn tractor. The disclosed subject matter can also be adapted for use in any walk-behind self-propelled machine such as but not limited to a tiller, a lawn edger, an aerator, and a snowblower. In addition, embodiments of the invention can be incorporated into any of a walk behind single blade mower, a walk behind multiple blade mower, a riding single blade mower, and a riding multiple blade mower. The riding mowers can be typical tractor type mowers, ride behind mowers, and zero turning radius (ZTR), zero turn riding (ZTR), or zero turn (ZT) mowers.

In alternate embodiments configured as ride-on lawnmowers, the lawnmower 10 can be configured in a way to facilitate an operator using the input structure 54 to control the power distribution assembly 20 from a seat mounted on the frame 80 of the lawnmower 10. In alternate embodiments, the battery 30 and drive assembly 36 can be mounted on a frame 80 of the lawnmower 10. In a riding lawnmower embodiment, the input structure 54 can be disposed in an area of the lawnmower 10 that is accessible to an operator sitting in a seat on the frame 80 of the lawnmower 10.

In alternate embodiments, any of the operator inputs can be variable based on any appropriate parameter(s) instead of being predetermined values.

Exemplary embodiments of the input structure 54 can include a switch, lever, handle throttle device selector, knob, physical button, multiple directional buttons, digital button, LCD display, touch screen, any combination thereof, or any other appropriate input structure 54 that can permit an operator of the lawnmower 10 to select operator inputs. In alternate embodiments, the input structure 54 can be separate from the lawnmower 10, or included in a mobile application such that operator inputs can be received from a mobile device.

In alternate embodiments, the main controller 60 can output to the input structure 54 functioning as a display any indicator that may be useful to an operator of a lawnmower. Examples of such indicators can include, but are not limited to, a battery level indicator, a charge suggestion indicator, the current ground speed, the current cutting height, the blade speed, or low-power mode.

Exemplary embodiments can replace any of the propulsion motor driver 42, the blade motor driver 34, and the actuator driver 68 with the main controller 60.

Exemplary embodiments of the lawnmower 10 can include an ON/OFF switch or sleep mode switch. The ON/OFF switch or sleep mode switch can cause each of the blade motor driver 34, the propulsion motor driver 42, the actuator driver 68, and the main controller 60 to power down or go into a sleep mode. Thus, power consumption can be relatively low as compared to normal cutting operations of the lawnmower 10.

Embodiments of the battery 30 can be permanently mounted in the housing 28. Alternate embodiments of the lawnmower 10 can include a battery 30 that is removably mounted in the housing 28 so that the battery 30 can be electrically connected to a charging source. Further embodiments of the battery 30 can include a plurality of battery cells, and the case can be configured to space the battery cells apart from each other in a predetermined pattern. The battery cell(s) can be a rechargeable battery such as but not limited a lithium ion battery or a nickel-metal hydride battery. The case can be made from any appropriate electrically insulating material such as but not limited to electrically insulating plastics, ceramics, or insulated metal. Instead of battery cells, the battery 30 can be capacitors or a combination of capacitors and battery cells. In alternate embodiments of the lawnmower 10 that include ride-on lawnmowers, the battery 30 can be disposed at any location mounted on the frame 80 that facilitates connecting to a charging source.

Instead of the electric blade motor 32, exemplary embodiments of the blade assembly 38 can include an internal combustion engine, or a hybrid of an internal combustion engine and an electric motor.

Instead of the drive transmission 40 and the propulsion motor driver 42, exemplary embodiments of the drive assembly 36 can include a power take-off assembly that can transfer rotary motion of the electric blade motor 32 or an internal combustion engine to the drive shaft 44. The power take-off assembly can include a clutch or slipping belt system that can be modulated by the main controller 60 directly, or via a secondary controller, in accordance with the first mode and the second mode of the main controller 60.

Although the lawnmower 10 is shown and described as including a single blade 22, exemplary embodiments can include a plurality of blades 22. For example, a pair of blades can be concentrically mounted on the blade shaft 24. In another exemplary embodiment, each of the blades can be mounted on a respective blade shaft.

In alternate embodiments, the main controller 60 can be configured to suggest alternate run times, ground speeds, or blade heights to the operator based on the operator's requested ground speed and requested cutting height. In other embodiments, the main controller 60 can display a notification that the battery 30 needs to be charged to fulfil the requested run time. The input structure 54 can be configured to display the state of charge of the battery 30 before and/or during operation.

The main controller 60 can be configured, in yet another alternate embodiment, to signal multiple adjustments before operation and/or during operation of the lawnmower 10. The main controller 60 can update the calculation of estimated run time periodically during operation of the lawnmower 10. For example, the main controller 60 can calculate that the estimated run time will be less than the operator's requested run time based on the operator's initial inputs. The main controller 60 can set the initial ground speed and cutting height such that the estimated run time will be equal to or greater than the operator's requested run time. Once the operator has started operation of the lawnmower 10, the main controller 60 can periodically recalculate the estimated run time based on at least one of the operator's initial requested inputs, the current ground speed and current cutting height, the power consumption of the lawnmower 10, and the state of charge of the battery 30. If the main controller 60 determines that the estimated run time will remain greater than or equal to the requested run time even if the lawnmower operating settings are set to the operator's initial requested settings, the main controller 60 can readjust at least one of the current cutting height to a cutting height that is in a range of cutting heights that is lower than the current cutting height and greater than or equal to the initial requested cutting height and the current ground speed to a ground speed that is in a range of ground speeds that is faster than the current ground speed and slower than or equal to the initial requested ground speed.

In an exemplary embodiment, the estimated run time can be expressed as a sum total run time that can include the estimated remaining run time and the present value of the elapsed run time. In alternate embodiments, the estimated run time can be calculated based on any combination of the requested run time, the requested ground speed, the requested cutting height, the state of charge of the battery, the power consumption of the lawnmower, the elapsed run time, the current ground speed, the current cutting height, the power consumption of any assembly of the lawnmower 10, and any other factor that can affect the capacity and rate of power draw from the battery 30 (such as weather, location, humidity, grass height, etc.). In alternate embodiments, the estimated run time can be a timer based on a fixed run time or a periodically updated remaining time calculated by the main controller 60 based on the rate of power consumption from the battery 30 to each of the blade assembly 38, the drive assembly 36, and the lift assembly 70.

The power consumption calculated by the main controller 60 can be determined by measuring the power draw to each assembly of the lawnmower 10. Alternatively, the power draw to each assembly can be based on empirical data tables stored in the memory of the main controller 60 corresponding to power draw from each assembly at various predetermined operational settings, such as previous times at which the lawnmower cut a particular lawn at various weather, humidity, grass height, or other conditions).

In alternate embodiments, the main controller 60 can be configured to periodically monitor the state of charge of the battery 30 and periodically calculate and/or update the estimated run time. As a result, the main controller 60 can be configured to adjust at least one of the ground speed and the cutting height multiple times during operation of the lawnmower 10. The main controller 60 can be configured to calculate an estimated run time based on the operator's inputs and the state of charge of the battery 30 and if the estimated run time is less than the operator's requested run time, adjust at least one of the initial cutting height and the initial ground speed relative to the operator's requested cutting height or requested ground speed such that the estimated run time is equal to or greater than the requested run time.

What is claimed is:

1. An adaptive cutting system, comprising:
a housing;
a battery;
a motor electrically connected to the battery;
a drive assembly connected to the motor and configured to move the system relative to ground at a predetermined speed;
a blade located adjacent the housing; and
a controller configured to
adjust at least one of a cutting height of the blade and a ground speed output by the drive assembly based on a predetermined run time and a state of charge of the battery,
calculate an estimated run time based on a power consumption from the battery and the state of charge of the battery, and
change a current cutting height of the blade to a second cutting height, where the second cutting height is greater than the current cutting height, when the estimated run time is less than the predetermined run time.

2. The adaptive cutting system of claim 1, wherein the controller is configured to
change a current ground speed output by the drive assembly to a second ground speed, where the second ground speed is slower than the current ground speed, when the estimated run time is less than the predetermined run time.

3. The adaptive cutting system of claim 1, wherein,
the housing includes a lawnmower deck, and the system includes
a lift assembly in electrical communication with the controller and movably connected to the lawnmower deck, wherein
the controller is configured to
actuate the lift assembly to change the current cutting height to the second cutting height, and change a current ground speed output by the drive assembly to a second ground speed, where the second ground speed is slower than the current ground speed, when the estimated run time is less than the predetermined run time.

4. The adaptive cutting system of claim 1, wherein
the controller is configured to determine the state of charge of the battery based on input from a sensor on the battery and at least one of: weather conditions; location information; grass height information; and humidity conditions.

5. The adaptive cutting system of claim 1, further comprising:
a display in electrical communication with the controller, wherein
the controller is configured to
output to the display a remaining run time based on at least one of the predetermined run time, a power consumption from the battery, and the state of charge of the battery.

6. The adaptive cutting system of claim 1, wherein
the controller is configured to
set an initial ground speed output by the drive assembly based on the predetermined run time, the state of charge of the battery, and at least one of a requested cutting height and a requested ground speed.

7. The adaptive cutting system of claim 1, further comprising:
an operator input mechanism, wherein
the controller is configured to
receive an operator input to the operator input mechanism that includes at least the predetermined run time, and
set an initial cutting height of the blade and an initial ground speed output of the drive assembly based on the predetermined run time and the state of charge of the battery such that the state of charge of the battery will be greater than zero throughout the predetermined run time.

8. The adaptive cutting system of claim 1, further comprising:
a display in electrical communication with the controller, wherein
the controller is configured to
output to the display a remaining run time based on at least one of the predetermined run time and the state of charge of the battery, and
the display is located on one of a walk behind single blade mower, a walk behind multiple blade mower, a riding single blade mower, and a riding multiple blade mower.

9. A lawnmower comprising:
a deck;
a blade rotatably supported in the deck;
a battery;
an electric motor in electrical communication with the battery;
a plurality of wheels;
a drive assembly connected to at least one of the plurality of wheels, and configured to drive the at least one of the plurality of wheels;
a lift assembly connected to the deck; and
a controller in electrical communication with the battery, the drive assembly, and the lift assembly, the controller configured to
adjust at least one of a cutting height of the blade and a ground speed output by the drive assembly based on a predetermined run time and a state of charge of the battery,
calculate an estimated run time based on a power consumption from the battery and the state of charge of the battery, and
change a current cutting height of the blade to a second cutting height, where the second cutting height is greater than the current cutting height, when the estimated run time is less than the predetermined run time.

10. The lawnmower of claim 9, wherein
the controller is configured to
actuate the lift assembly to change the current cutting height to the second cutting height, and change a current ground speed output by the drive assembly to a second ground speed, where the second ground speed is slower than the current ground speed, when the estimated run time is less than the predetermined run time.

11. The lawnmower of claim 9, wherein
the electric motor is mounted on the deck, and
the lift assembly movably mounts the plurality of wheels to the deck, and
the lawnmower is configured as one of a walk behind single blade mower, a walk behind multiple blade mower, a riding single blade mower, and a riding multiple blade mower.

12. The lawnmower of claim 9, further comprising:
a display in electrical communication with the controller, wherein the display outputs a remaining time calculated by the controller based on a power consumption from the battery and the state of charge of the battery.

13. The lawnmower of claim 12, wherein
the controller is configured to
   receive a selection of the predetermined run time from a plurality of predetermined run times, an initial cutting height from a plurality of predetermined cutting heights, and an initial ground speed from a plurality of predetermined ground speeds, and
   signal the display to show the predetermined run time, the initial cutting height, and the initial ground speed.

14. The lawnmower of claim 12, wherein
the display is configured to
receive a selection of at least one of a plurality of predetermined run times, a plurality of predetermined cutting heights, and a plurality of predetermined ground speeds, and
transmit to the controller the selection of one of the plurality of predetermined run times, the plurality of predetermined cutting heights, and the plurality of predetermined ground speeds.

15. The lawnmower of claim 9, wherein
the controller is configured to calculate an estimated run time based on information received from a battery sensor and at least one of: weather conditions; location information; grass height information; and humidity conditions.

16. The lawnmower of claim 9, wherein
the lift assembly includes
   an actuator connected to the deck, and
   a connecting structure connected to the plurality of wheels such that the plurality of wheels are movable relative to the deck in a direction substantially parallel to a rotary axis of the blade.

17. The lawnmower of claim 9, further comprising:
a frame, wherein
the lift assembly includes
   an actuator connected to the frame, and
   a connection structure connected to the actuator and the deck such that the deck is moveable relative to the frame in a direction substantially parallel to a rotary axis of the blade.

18. A method of managing power consumption of an electric lawnmower having a controller and a battery, comprising:
   calculating via the controller an estimated run time for the electric lawnmower based on a power consumption from the battery and a state of charge of the battery;
   raising a cutting height of the lawnmower when the controller determines that the estimated run time is less than a predetermined time; and
   slowing a ground speed of the lawnmower when the controller determines that the estimated run time is less than the predetermined time.

19. The method of claim 18, further comprising:
selecting the predetermined time from a plurality of predetermined times.

* * * * *